May 4, 1926. Re. 16,346

J. DITSON

SHANK AND BIT PUNCH

Original Filed March 21, 1925

INVENTOR.
Jesse Ditson
BY Herbert G. Ogden
HIS ATTORNEY

Reissued May 4, 1926.

Re. 16,346

UNITED STATES PATENT OFFICE.

JESSE DITSON, OF LITTLETON, COLORADO, ASSIGNOR TO INGERSOLL-RAND COMPANY, OF JERSEY CITY, NEW JERSEY, A CORPORATION OF NEW JERSEY.

SHANK AND BIT PUNCH.

Original No. 1,554,799, dated September 22, 1925, Serial No. 17,451, filed March 21, 1925. Application for reissue filed February 10, 1926. Serial No. 87,452.

*To all whom it may concern:*

Be it known that I, JESSE DITSON, a citizen of the United States, a resident of Littleton, in the county of Arapahoe and State of Colorado, have invented a certain Shank and Bit Punch, of which the following is a specification, accompanied by drawings.

This invention relates to devices for reforming the bore of hollow articles, but more particularly to a fluid actuated device for pinning out the bore adjacent the shank and bit of drill steels, especially when the bore becomes deformed during the process of sharpening.

An object of the invention is to drive a punch pin into a bore of the drill steel and withdraw it therefrom by delivering impact blows upon opposite ends of the member supporting the punch pin.

Another object is to enable either end of a punch pin supporting member to be selectively exposed to the impact blows of a hammer piston for driving the supporting member in the direction of the exposed end.

Other objects will be in part obvious and in part pointed out hereinafter.

Figure 1:
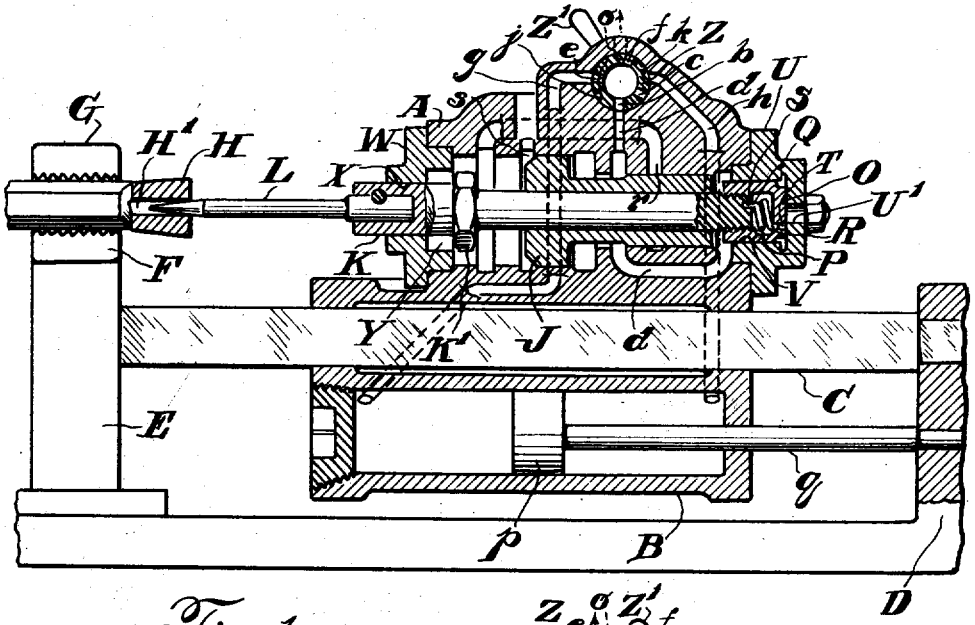
Figure 2:
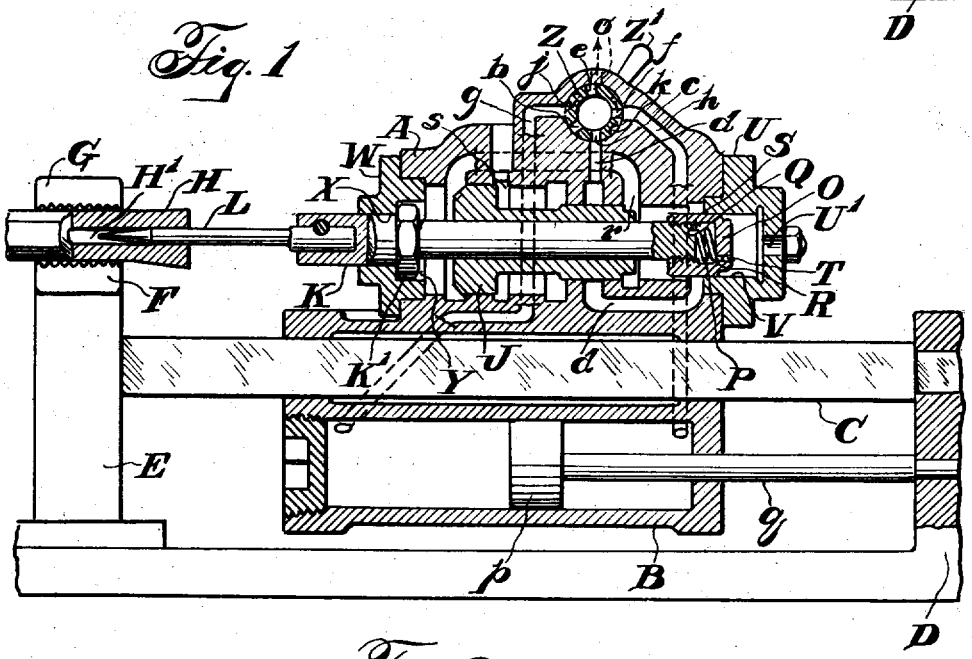

In the drawings forming part of the specification and in which similar reference characters refer to similar parts, Figure 1 is a longitudinal sectional view in elevation of a shank and bit punch showing the position of the parts when driving the punch pin into the drill steel; and Figure 2 is a similar view showing the position of the parts when withdrawing the pin from the drill steel.

Referring to the drawings, a shank and bit punch having a hammer cylinder A and a feed cylinder B is shown mounted slidably upon a bar C. The device may be mounted on a drill sharpener, or on a pedestal, or as shown in which a bracket D supports one end of the bar C and the other end of the bar is supported by a post E. In this instance, the post E rests on the base of the bracket D and may terminate in a jaw F at its upper end. A movable jaw G cooperates with the jaw F for holding a hollow drill steel H, although these jaws may be upon the drill sharpener. The jaws are so positioned that the longitudinal axes of the drill steel H and the hammer cylinder A coincide.

In accordance with the present invention, a hammer piston J of the differential type having a hollow bore is adapted to reciprocate with the cylinder A. In this instance the anvil block K supports a punch pin L at its forward end. The anvil block K also has a shank which extends through the bore of the piston and is provided with a collar K′ near one end to receive the impact blows of the piston for driving the punch pin into the bore H′ of the drill steel. Means are provided for utilizing impact blows of the piston J to withdraw the punch pin L from the steel H. To this end, the rearward end of the shank of the anvil block K is screw threaded and carries a recessed nut O. Disposed within the nut O is a compression spring P, the ends Q and R of which are adapted to extend into apertures S and T of the shank of the anvil block K and the nut O respectively, to hold the nut against rotation with respect to the anvil block. In addition to locking the nut, the spring P also exerts pressure against the nut and forces the inner surfaces of the cooperating threads in full contact with each other, thus protecting the threads against breakage which might otherwise be caused by the blows of the hammer position J against the nut O.

In this instance a back head U forms a closure for the rearward end of the cylinder A and is provided with a recess V to enable the nut O to extend therein, so that the nut O is removed from the path of the hammer piston while the punch L is being driven into the drill steel H, as shown in Figure 1. A suitable vent U′ is formed in the back head U to prevent cushioning of the blows while the anvil block K is being driven rearwardly. A front head W is arranged in the other end of the cylinder A and has a bore X to support the forward end of the anvil block K. A recess Y in the front head W is adapted to receive the collar K′ of the anvil block K when the nut O is exposed to the blows of the hammer piston J. The front and back heads W and U are held to the cylinder by the usual through bolts, not shown.

The admission of the pressure fluid to the cylinders A and B is controlled by a throttle valve Z having a throttle lever Z′. In this instance the throttle valve is provided with a pair of ports *b* and *c* which are arranged so that one or the other of said ports may register with the passage *d* for supplying pressure fluid to the hammer cylinder A. A similar pair of ports *e* and *f* are adapted to register with passages *g* and *h* respectively for supplying pressure fluid to the ends of the cylinder B. In this instance grooves *j* and *k* are formed on opposite sides of the valve Z and are so arranged that one of said grooves will register with one of the passages to the cylinder B and an exhaust passage *o* in either position of the valve for exhausting pressure fluid from one end of said cylinder while pressure fluid is being admitted to the other end. A piston *p* is arranged within the cylinder B and is held stationary by a rod *q* anchored at one end to the bracket D.

Constant pressure is maintained in the rear end of the cylinder A, and distribution of the pressure fluid to the opposite faces of the head of the piston J is controlled by the shank of said piston. Pressure fluid is admitted to the forward end of the cylinder A through a passage *r* which communicates at its rearward end with said cylinder at a point between the passage *d* and the rearward end of the cylinder A. The exhaust of pressure fluid from the cylinder A is effected through an exhaust passage *s* controlled by the head of the piston J.

In operation of the device, let it be assumed that the punch L is about to be driven into the steel H. With the valve in the position shown in Figure 1, pressure fluid is admitted simultaneously to the hammer cylinder A and the forward end of the feed cylinder B which will cause the device to move toward the steel H. As the device continues in this direction the punch L is pressed against the end of the steel H and is held temporarily stationary until the cylinder has advanced sufficiently to expose the the collar K′ of the anvil block to the blows of the piston J, whereupon the punch will be driven into the steel H.

In order to withdraw the punch L from the drill steel H, the throttle valve Z is turned to the position shown in Figure 2. In this position of the valve, pressure fluid is admitted to the passage *d* through the port *c*, and to the back end of the feed cylinder B through the port *f* and the passage *h*. The device will then move rearwardly, and since the punch L tends to bind in the drill steel H, the anvil block will be held against movement until the nut O is exposed to the blows of the hammer piston J thereby withdrawing the punch L from the drill steel.

It will be observed that during the withdrawal of the punch, the collar K′ is removed from the path of the piston J which is also true of the nut O while the punch is being driven into the drill steel.

I claim:

1. In a shank and bit punch for drill steels, the combination of means for holding the drill steel, a hammer cylinder, a fluid actuated reciprocating hammer piston in said cylinder, an anvil block mounted in said cylinder and having a shank extending through the piston, a pin carried by said anvil block and adapted to enter the drill steel, and means on the anvil block to cooperate with the piston for driving the anvil block in opposite directions.

2. In a shank and bit punch for drill steels, the combination of means for holding the drill steel, a hammer cylinder, a fluid actuated reciprocating hammer piston in said cylinder, an anvil block mounted in said cylinder and having a shank extending through the piston, a pin carried by said anvil block and adapted to enter the drill steel, an abutment on the anvil block forwardly of the hammer piston to receive the blows of the piston for driving the anvil block and pin in one direction, and another rearward abutment on the anvil block to receive the blows of the piston for driving the anvil block and pin in the opposite direction.

3. In a shank and bit punch for drill steels. the combination of means for holding the drill steel, a hammer cylinder, a fluid actuated reciprocating hammer piston in said cylinder, an anvil block mounted in said cylinder and having a shank extending through the piston, a pin carried by said anvil block and adapted to enter the drill steel, and abutments on the anvil block forwardly and rearwardly of the piston for enabling the piston to hammer the pin into and out of the drill steel.

4. In a shank and bit punch for drill steels, the combination of means for holding the drill steel, a hammer cylinder, a fluid actuated reciprocating hammer piston in said cylinder, an anvil block mounted in said cylinder and having a shank extending through the piston, a pin carried by said anvil block and adapted to enter the drill steel, abutments on the anvil block forwardly and rearwardly of the piston for enabling the piston to hammer the pin into and out of the drill steel, and means for moving one abutment or the other into the path of the piston in accordance with the direction in which the pin is to be driven.

5. In a shank and bit punch for drill steels, the combination of a guide, a hammer cylinder slidable on said guide, a reciprocatory hammer piston in said cylinder, an anvil block adapted to carry a pin in one end, a shank on said anvil block extending through said piston, means on the anvil block to cooperate with the piston for driving the anvil block in opposite directions, and means for moving the device along the guide.

6. In a shank and bit punch for drill steels, the combination of a guide, a hammer cylinder slidable on said guide, a reciprocatory hammer piston in said cylinder, an anvil block adapted to receive a pin in one end and the other end of the anvil block extending through said piston, means on the anvil block to receive the blows of the piston for driving the anvil block in the direction of movement of the hammer cylinder, a pin carried by the anvil block and means including a cylinder and a piston for moving the device along the guide.

7. In a shank and bit punch for drill steels, the combination of a guide, a hammer cylinder slidable on said guide, a reciprocatory hammer piston in said cylinder, an anvil block adapted to receive a pin in one end and the other end of the anvil block extending through said piston, a collar on said anvil block to receive the blows of the piston for driving the anvil block in one direction, a nut associated with the anvil block to receive the blows of the piston for driving the anvil block in the opposite direction, a feed cylinder adapted to receive pressure fluid at its ends to move the device along the guide and a stationary piston in said cylinder.

8. In a shank and bit punch, the combination of a guide, a hammer cylinder slidable on said guide, a reciprocatory hammer piston in said cylinder, a longitudinally movable anvil block extending through said piston, a punch pin carried by the forward end of the anvil block, a collar on said anvil block to receive the blows of the piston when the cylinder moves in one direction, a nut screwed on the anvil block to receive the blows of the piston when the cylinder moves in the opposite direction, a spring to lock the nut against rotation with respect to the anvil block, a cylinder adapted to receive pressure fluid at its ends to move the device along the guide, and a piston in said cylinder.

9. In a shank and bit punch, the combination of a guide, a hammer cylinder slidable on said guide, a reciprocatory hammer piston in said cylinder, a longitudinally movable anvil block extending through said piston, a punch pin carried by the forward end of the anvil block, a collar on said anvil block to receive the blows of the piston when the cylinder moves in one direction, a nut screwed on the anvil block to receive the blows of the piston when the cylinder moves in the opposite direction, a spring interposed between the anvil block and the nut and anchored to said anvil block and nut for holding the nut against rotation with respect to the anvil block and to force the faces of the nut threads to contact with the corresponding faces of the threads on the anvil block, a feed cylinder for moving the device along the guide, a piston in said cylinder, and ports and passages for supplying pressure fluid to the cylinders.

In testimony whereof I have signed this specification.

JESSE DITSON.